United States Patent
Hoon et al.

(10) Patent No.: US 6,319,744 B1
(45) Date of Patent: Nov. 20, 2001

(54) METHOD FOR MANUFACTURING A THERMOELECTRIC SEMICONDUCTOR MATERIAL OR ELEMENT AND METHOD FOR MANUFACTURING A THERMOELECTRIC MODULE

(75) Inventors: Lee Yong Hoon, Hiratsuka; Takeji Kajiura, Isehara, both of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/584,398

(22) Filed: Jun. 1, 2000

(30) Foreign Application Priority Data

Jun. 3, 1999 (JP) .................................................. 11-156650

(51) Int. Cl.$^7$ .................................................. H01L 21/00
(52) U.S. Cl. ............................................. 438/54; 438/965
(58) Field of Search ................................ 438/965, 54, 57, 438/47

(56) References Cited

U.S. PATENT DOCUMENTS

| | | | |
|---|---|---|---|
| 5,166,943 | * 11/1992 | Dixon et al. | 372/21 |
| 5,951,908 | * 9/1999 | Cui et al. | 252/62.9 R |
| 5,981,007 | * 11/1999 | Rubin et al. | 428/25.5 |
| 6,093,338 | * 7/2000 | Tani et al. | 252/62.9 R |
| 6,121,539 | * 9/2000 | Johnson et al. | 136/203 |

* cited by examiner

Primary Examiner—Richard Elms
Assistant Examiner—Bradley Smith
(74) Attorney, Agent, or Firm—Varndell & Varndell, PLLC

(57) ABSTRACT

To provide a method for manufacturing a thermoelectric semiconductor material or a thermoelectric semiconductor element and method for manufacturing a thermoelectric module effective in improving thermoelectric performance. The thermoelectric semiconductor material is manufactured by producing a laminated body of thin powders manufactured by a quenching roller method, and compressing simultaneously the side surfaces of the laminated body using a secondary punch.

6 Claims, 11 Drawing Sheets

METHOD FOR MANUFACTURING A THERMOELECTRIC SEMICONDUCTOR MATERIAL OR ELEMENT AND METHOD FOR MANUFACTURING A THERMOELECTRIC MODULE

BACKGROUND OF THE INVENTION

1. Field of the Invention

The present invention relates to a method for manufacturing a thermoelectric semiconductor material or element and a method for manufacturing a thermoelectric module, and more particularly, it relates to a method for manufacturing a thermoelectric semiconductor material or element and a method for manufacturing a thermoelectric module effective in improving thermoelectric performance.

2. Description of the Related Art

Hitherto, thermoelectric elements that utilize thermoelectric phenomena have been employed as heat exchangers and temperature sensors. These thermoelectric phenomena are commonly known as the Peltier effect, Thomson effect and Seebeck effect, a description of each of which is given below.

The Peltier effect is a phenomenon arising when an electric current flows to the junction between different metal types and heat is generated or absorbed at the junction, and the Thomson effect is a phenomenon arising when an electric current flows to a metal which has a temperature gradient and heat is generated or absorbed at the junction. A Peltier element, which is used as an electro-cooler, is a thermoelectric element in which the above-described Peltier effect is utilized.

The Seebeck effect is a phenomenon in which, when the junction of metals of different type is maintained at a different temperature, an electromotive force is generated in the high temperature side and low temperature side of the sample, and thermoelements used as temperature sensors are thermoelectric elements which utilize this Seebeck effect.

Because the thermoelectric elements described above possess a simple structure, stable characteristics, and they are easy to handle, wide research and development is being undertaken with a view to their application in small-scale refrigerators as well as in the thermo-regulation of semiconductor lasers.

At the present time, alloys comprising 1 or 2 types chosen from a group comprising Tellurium (Te) and Selenium (Se), and 1 or 2 types chosen from a group comprising Bismuth (Bi) and Antimony (Sb), are used as the material for forming the above-described thermoelectric elements. These compounds, which are stratified-structure compounds, are semiconductors which, in the thermoelectrical characteristics attributable to crystal structures, possess anisotropic properties.

As a technique designed to improve the degree of orientation and the fineness of grains which comprise the stratified-structure compounds as described above, the quenching roller method is well known. The quenching roller method is a method for manufacturing thin films (hereinbelow referred to as "thin powders") with sub-micron class grains in which the stratified-structure compound, in a melted state, is caused to contact the surface of a rotating cooling roller. Examples of the prior art which disclose examples of the application of this quenching roller method include Japanese Patent Application Laid-open No. 8-306970 and Japanese Patent No. 2659309.

Japanese Patent Application Laid-open No 8-306970 discloses a technique in which the powder of thin powders obtained by the quenching roller method are solidified and molded using a hot press method. Because the powder of the thin powders obtained by the quenching roller method are configured from grains which have been made finer, based on the method described in Japanese Patent Application Laid-open No 8-306970, a thermoelectric element with high performance index can be expected.

Meanwhile, Japanese Patent No. 2659309 describes a technique in which thin powders, obtained by the quenching roller method, are laminated in the film thickness direction to effectively utilize the crystal orientation of the thin powders. In this quenching roller method, because the material which is in contact with the surface of the cooling roller is cooled from the center of the roller to the outer side, setting of the material occurs in the film thickness direction, and as a result, thin powders are obtained in which the C surface, which constitutes the base surface of the stratified-structure compound, is upright in the film thickness direction. If the thin powders are laminated in the film thickness direction, a thermoelectric element with high anisotropic properties is obtained.

In Japanese Patent No. 2659309, the thin powders laminated in the film thickness direction are pressed parallel to the film thickness direction to form the molded body, and terminals are attached thereto forming the thermoelectric element. An electric current is caused to flow from the terminals parallel to the film thickness direction of the thin powders wherein a thermoelectric element with high performance index, in which the anisotropic properties of the thin powders are utilized effectively, is produced.

However, in recent years, there has been a desire for thermoelectric elements with improved thermoelectric performance, and a search is underway for new techniques which further develop the above-noted techniques of the prior art.

SUMMARY OF THE INVENTION

Thereupon, an object of the present invention is to provide a method for manufacturing a thermoelectric semiconductor material or element, and a method for manufacturing a thermoelectric module, which are effective in improving thermoelectric performance.

The approach described below, which has led to the completion of the present invention, was adopted as a means for achieving the above-described objectives.

Firstly, an examination of the method described in the above-noted Japanese Patent No. 2659309, that is to say, the method for pressing the thin powders laminated in the film thickness direction parallel to the film thickness direction, was carried out, and the following conclusions were reached.

It was thought that, because the thin powders themselves have a configuration in which the C surface, which constitutes the base surface of the stratified-structure compound, is upright in the film thickness direction, and the thin powders described in the above-noted document are laminated in the film thickness direction, the configuration would be one in which the electric anisotropic properties were utilized effectively.

Furthermore, the following description is given in the latter half of paragraph 0018 of the cited document:

". . . in addition, the interface between the thin films can be eliminated by the press-sintering of the thin films, which comprise aligned crystals, in the film thickness direction. It is thought that, for this reason, the crystals extend beyond the thin film interface growing in the film thickness direction wherein the resistivity ρ is made smaller."

From this description it was thought that, because a reduction in resistivity □ can be expected due to the pressing in the film thickness direction, the technique would be extremely effective in improving thermoelectric performance.

However, when the characteristics of the thermoelectric element actually manufactured by the above-described method were examined, the expected level of thermoelectric performance was not obtained. Because the crystal orientation of the thin powders produced by the quenching roller method is quite high, it seemed likely that, judging from the essential degree of orientation of the thin powders, a higher thermoelectric performance would be obtained, but the thermoelectric performance obtained was not as predicted. Moreover, a further improved performance could also be expected if the crystals were to extend beyond the thin film interface growing in the film thickness direction, but this tendency was not observed.

Thereupon, in the pursuit of the cause for the thermoelectric performance not improving to the degree expected, it was discovered that the cause lay in the pressing in the film thickness direction. That is to say, due to the pressing in the film thickness direction, in the inner part of the thin powders, the essential crystal orientation of the thin powders is disturbed, and at the interface of the thin powders, the surfaces are caused to collide with each other generating fine grains due to the breakage and so on (this state is hereinbelow referred to as the "crushed state"), and these are main factors in the increase in electrical resistance ρ.

Accordingly, it appeared that, if the orientation, which is disturbed by the pressing in the film thickness direction, was aligned, and the crushing of the grains generated at the interface of the thin powders was corrected, the thermoelectric performance could be improved. As a result of a series of creative operations with this in mind, the idea of "compressing from a direction orthogonal to the laminated direction" was conceived leading to the completion of the present invention which was found to be effective in solving the above-noted problems.

BRIEF DESCRIPTION OF THE DRAWINGS

FIGS. 13(a) to 13(c) illustrate a shape of an injection nozzle used in an embodiment of the present invention (an embodiment for producing thin powders 12), in which FIG. 13(a) is a side view, FIG. 13(b) is a sectional view taken on the line A—A of FIG. 13(a) and FIG. 13(c) is a plan view viewed from the direction indicated by the arrow B of FIG. 13(b).

DESCRIPTION OF THE PREFERRED EMBODIMENTS (Outline of the Invention)

One of the features of the present invention is that the compression of the laminated body of thin powders is carried out in a direction which is orthogonal to the laminated direction. The principle idea, which is the push-pressuring from a direction which is orthogonal to the laminated direction, constitutes a complete shift and new concept from the hitherto generally accepted method of push-pressuring parallel to the laminated direction.

The technical significance of push-pressuring from the direction which is orthogonal to the laminated direction lies in the arrangement of the crystal orientation of the thin powders. That is to say, the grains within the thin powders are configured from a stratified-structure compound, and the C surface, which constitutes the base surface of the stratified-structure compound, has a characteristic whereby it is easily made upright in the direction which is vertical with the compressing direction.

In the laminated body of the thin powders, because, in the first place, the C surface of the stratified-structure compound is orientated almost upright along the laminated direction, if the laminated body is compressed from a direction orthogonal to the laminated direction the degree of upright orientation of the C surface is further improved and better thermoelectric performance can be obtained.

The above-described action is effective as a means for correcting the disturbance of the crystal orientation generated by the push-pressuring parallel with the laminated direction, that is to say, that of the conventional method.

In addition, the "push-pressuring from the direction orthogonal to the laminated direction", which constitutes the characterizing feature of the present invention, is effective as a means for repairing the crushing of the grains generated at the interface of the thin powders. That is to say, because it is thought that, at the interface of the thin powders, the C surface of the stratified-structure compound grows in the direction of weaker stress, by the push-pressuring from the direction orthogonal to the laminated direction, the C surface of the stratified-structure compound is orientated upright, or the grains are re-grown and the degree of orientation at the interface is improved. As a result, the electrical anisotropic properties of the thermoelectric semiconductor are improved.

(Basic matters)

First, a description will be given of the crystal structure of the stratified-structure compound which constitutes a basic matter of the present invention. As knowledge of the crystal structure is effective in understanding the present invention a detailed description is given below.

Figure 1:
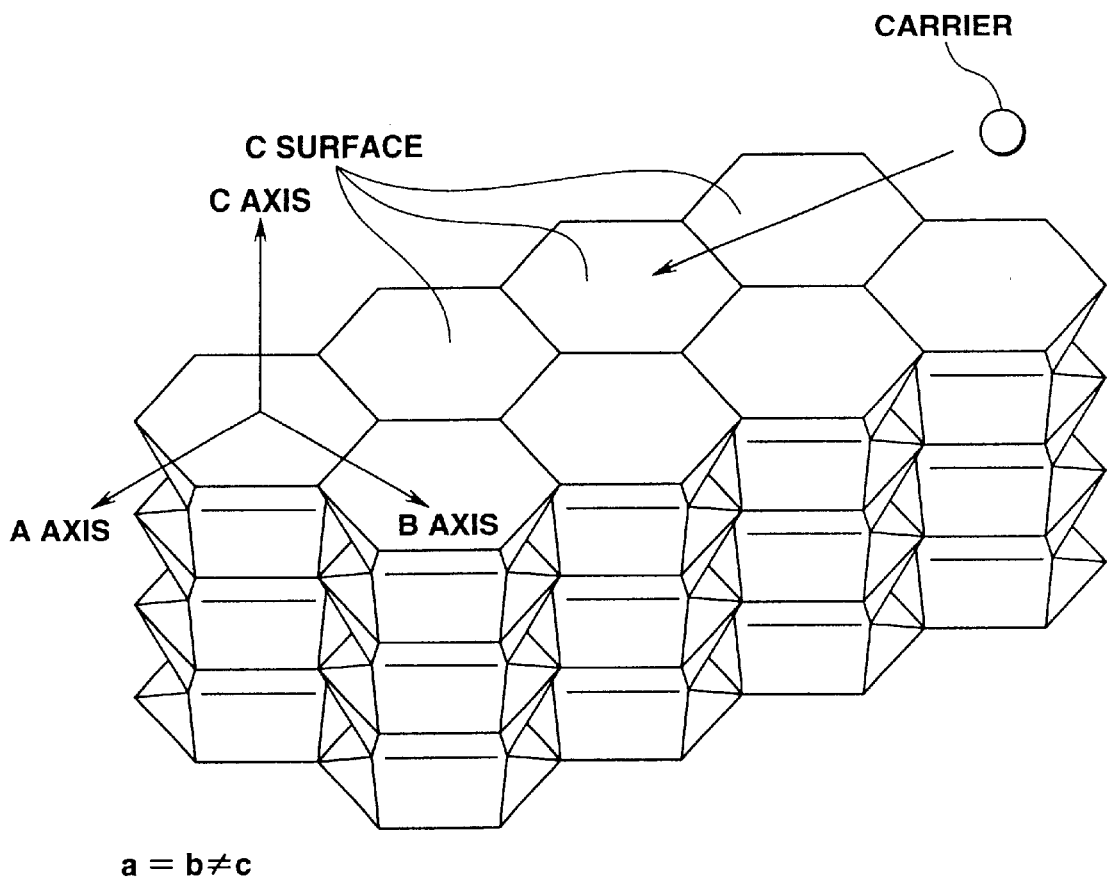
FIG. 1 is a model perspective view which shows the crystal structure of a stratified-structure compound.

FIG. 1 is a model perspective view which shows the crystal structure of the stratified-structure compound. The diagram shows the crystal structure of a stratified-structure compound which contains a group V element and a group VI element in a composition ratio of 2 to 3. In addition, the crystal structure shown in the diagram is one in which it is supposed that Bismuth (Bi) and Antimony (Sb) are the group V elements, and Tellurium (Te) and Selenium (Se) are the group VI elements.

As is shown in the same diagram, the compound of the group V element and the group VI element has a hexagonal system structure, and the section indicated by the hexagonal form in the diagram is the base surface of the stratified-structure compound, and the crystal surface is referred to as the C surface. The stratified-structure compound has a structure in which the C surface has been laminated many times in the C axis direction, and which spreads in the A axis direction.

It is the that, because the carrier flows most easily in the direction parallel to the C surface, the single crystal of the stratified-structure compound is the material with the highest electrical anisotropy. However, in the stratified-structure compound described above, because the bonding forces between the layers are weaker than the bonding forces within the layer surfaces, its use as a thermoelectric material with the single crystal unchanged is undesirable in terms of the material strength.

By way of example, because, in a Bismuth-Tellenium-based stratified-structure compound, weak van Der Waal's bonds exist between the Tellenium atoms, it has marked cleavage properties, and in a state which is close to single crystal, its durability as a thermoelectric element is inadequate. Therefore, the polycrystal of the stratified-structure compound is normally used as the thermoelectric semiconductor material.

Figure 2:
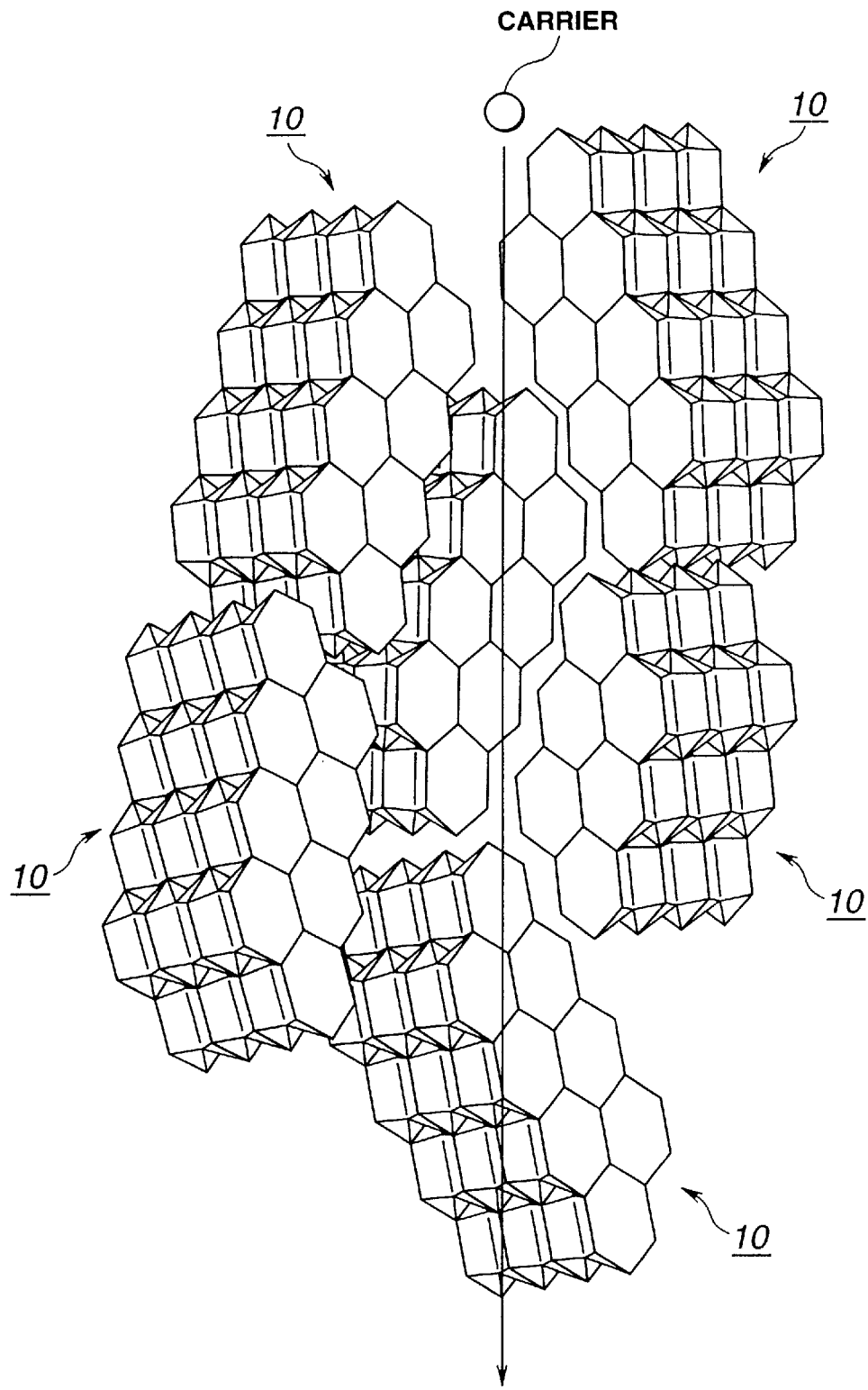
FIG. 2 is a model perspective view which shows the structure of the polycrystal of a stratified-structure compound.

FIG. 2 is a model perspective view which shows the structure of the polycrystal of the stratified-structure compound. As shown in the diagram, the polycrystal of the stratified-structure compound is an aggregate of fine grains 10 in which a material strength which is better than that of the single crystal can be obtained.

In addition, because phonon diffuses at the interface of the grains 10 (hereinbelow referred to as the "grain interface"), there is a tendency for the thermal conductivity of the thermoelectric elements formed by the polycrystal body which comprises the plurality of grains 10 to be lowered. Accordingly, polycrystal is a more preferred structure from the viewpoint of thermoelectric performance.

On the other hand, as described above, because the current carrier has a characteristic whereby it flows easily along the C surface of the stratified-structure compound, as shown in FIG. 2, the electrical resistance is lowered most in the state in which the C surface of the grains 10 are upright along all the paths of the current carriers (hereinbelow referred to as "upright orientation"). Accordingly, where a polycrystal material is employed, the upright orientation of the grains 10 is important in terms of improving the thermoelectric performance.

Here, the thermoelectric performance of the thermoelectric element is expressed by the formula below:

$$Z = \frac{\alpha^2 \sigma}{\kappa} = \frac{\alpha^2}{\rho \kappa}$$

here: Z=performance index (1/K); α=Seebeck coefficient (μV/K); σ=Conductivity (Ω−1 cm−1); κ=thermal conductivity (W/cmK); and ρ=electrical resistance (μΩ·cm).

Referring to the above formula, it can be seen that making the grains 10 finer to reduce the thermal conductivity κ, and orientating the grains 10 upright to lower the electrical resistance ρ, leads to improvements in the thermoelectric performance. In the present invention, the thermoelectric semiconductor material is caused to approach a state in which, as far as possible, all of the grains 10 are in complete upright orientation (hereinbelow referred to as "complete upright orientation") whereby a state in which the electrical resistance ρ is at its lowest is obtained. Here, a short definition of the "complete upright orientation" will be given.

Figure 3:
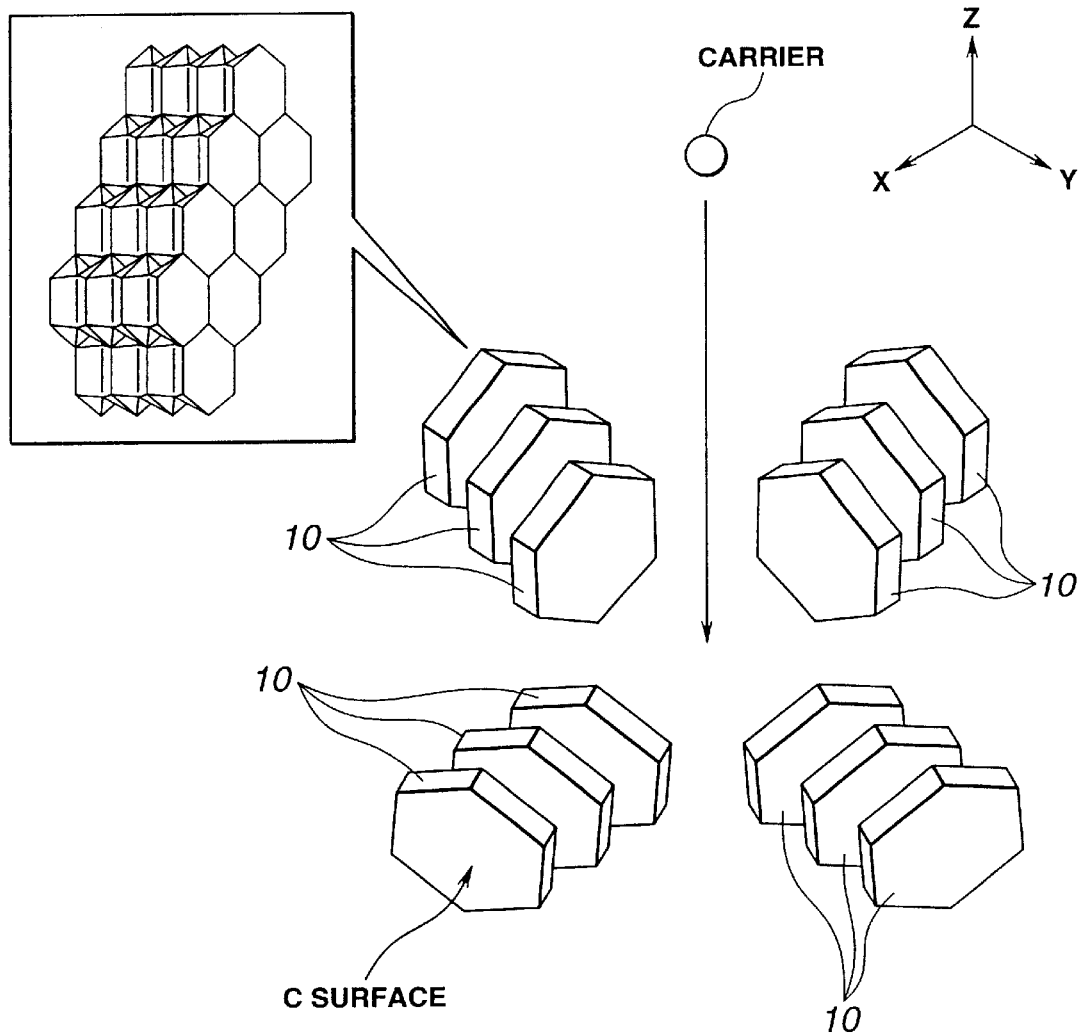
FIG. 3 is a model perspective view which shows a state in which the grains are in complete upright orientation.

FIG. 3 is a model perspective view which shows a state in which the grains are in complete upright orientation. The hexagonal form objects shown in the diagram show a simplification of the grains 10 shown in FIG. 2, and the hexagonal object surfaces indicate the C surface of the grains 10.

As is shown in the same diagram, in the case where the direction of travel of the current is taken as the Z axis, the state whereby the C surface is upright along the Z axis is defined as complete upright orientation irrespective of which direction the C surface of the grains 10 are facing with respect to the X axis and Y axis. If a polycrystal is obtained which is configured by grains which are complete upright orientated in this way, this is ideal as a thermoelectric semniconductor material. A description is given below of a configuration of the present invention effective as a means for affording this complete upright orientation.

(Aspects of the Invention)

Figure 4:
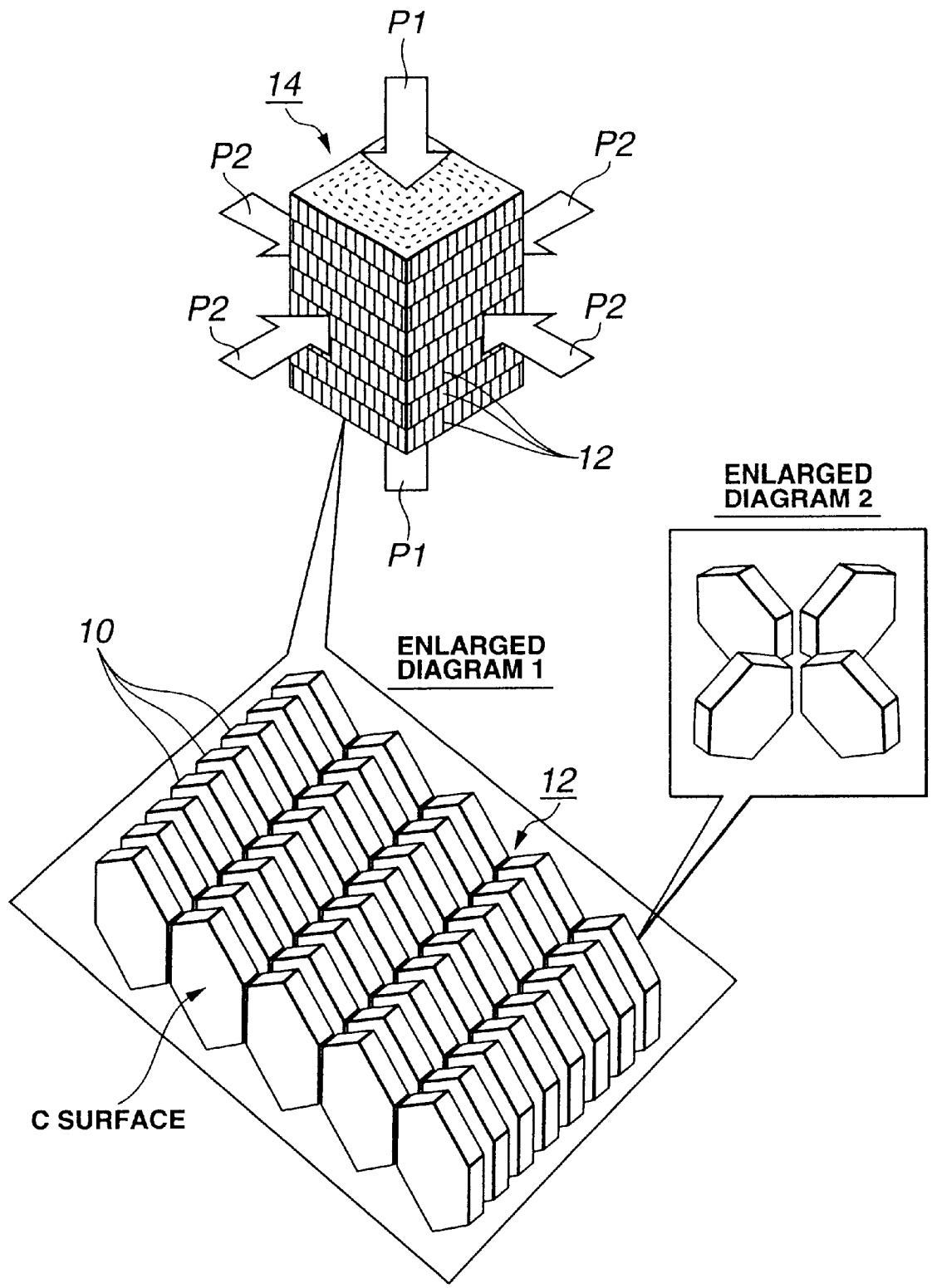
FIG. 4 is a model perspective view which shows, conceptually, the method for manufacturing the thermoelectric semiconductor material or element pertaining to the present invention.

FIG. 4 is a model perspective view which shows, conceptually, the method for manufacturing a thermoelectric semiconductor material or element pertaining to the present invention. A description is given below, based on the diagrams, of the configuration of the present invention.

In the present invention, first, the thin powders 12 manufactured by the quenching roller method are laminated in the film thickness direction to form a laminated body 14. As is clear by referring to the scale diagram 1 shown at the lower part of the diagram, in the thin powders 12 from which this laminated body 14 is configured, the C surface of the grains 10 contained within the thin powders 12 are in a state of upright orientation along the laminated direction. In this way, at the stage in which the thin powders 12 are laminated, the crystal orientation is in an almost ideal state. However, as shown in the scale diagram 2 in the same figure, although it is an upright state, in reality mixing occurs as the C surface faces different directions.

Next, the laminated body 14 is compressed from the direction which is parallel to the laminated direction of the thin powders 12 (vertical compression P1), and the laminated body 14 is compressed from a direction orthogonal with the laminated direction (side compression P2). The vertical compression P1 and side compression P2 may be applied simultaneously, or side compression P2 may be applied after the vertical compression P1 has been applied. It is desirable that, in the relationship between these compressing forces, the side compression P2 be larger than the vertical compression P1. This is because it is forecast that, when the force of the vertical compression P1 is stronger than the force of the side compression P2, the grains 10 will have a tendency to tilt.

In addition, the vertical compression P1 is applied at a degree of pressure which supports the upper surface and lower surface of the laminated body 14, and the side compression P2 may be applied in a state in which the movement along the laminated direction of the thin powders 12 is constrained.

In addition, it is desirable that the side compression P2 be applied on all side surfaces of the laminated body 14, and more preferably, that the compression be applied simultaneously on all side surfaces at a uniform force. The side surfaces referred to here represent the surfaces that surround the laminated axis of the laminated body 14. By the simultaneous compression at a uniform force in this way, a uniform force is applied to the grains 10 and a suitable upright state is obtained.

Figure 5A:
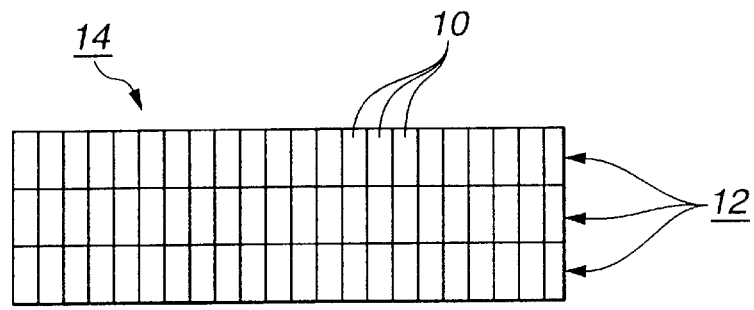
FIGS. 5(a) to 5(c) are model side views which show the changes in the semiconductor material thought to occur due to the compression shown in FIG. 4.
Figure 5B:
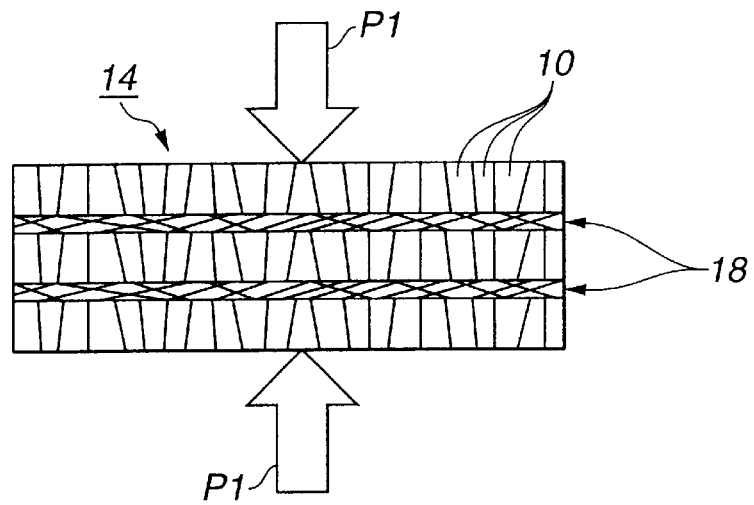
Figure 5C:
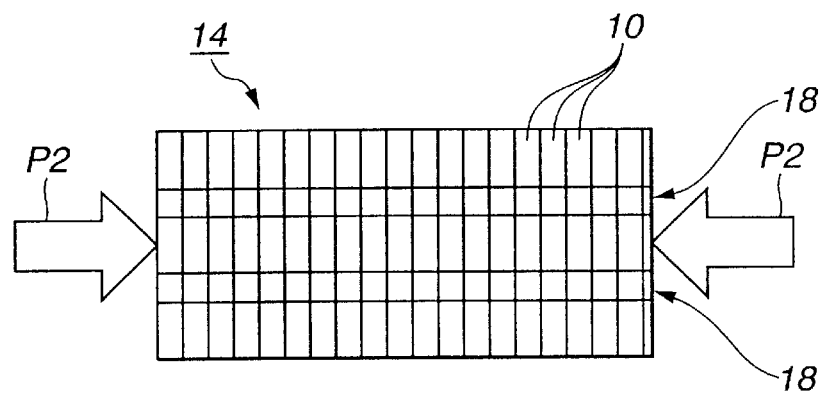

FIGS. 5(a) to 5(c) are model side views which show the changes in the semiconductor material thought to occur due to the compression shown in FIG. 4. As shown in FIG. 5(a), the grains 10 in the thin powders 12 are upright orientated at the stage in which the thin powders are laminated. However, following this, when vertical compression P1 is applied, as shown in FIG. 5(b), the orientation of the grains 10 within the thin powders 12 is disturbed and a crushing of the grains at the laminated interface 18 between the thin powders 12 is generated. It is thought that the thermoelectric performance does not improve as expected in conventional methods because the process is completed at this stage.

Figure 6:
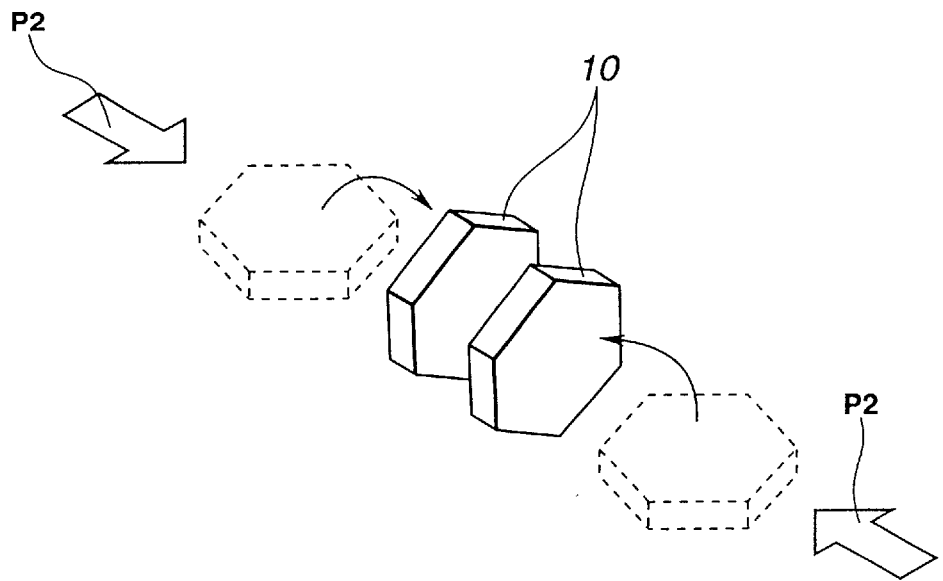
FIG. 6 is a model perspective view which shows the phenomenon thought to occur within the thin powders 12 of FIG. 5(b)

However, in addition to the above-described vertical compression P1, when the side compression P2 is applied, as shown in FIG. 5(c), the grains 10 in the thin powders 12 are re-orientated, the fallen grains of the grains crushed within the laminated interface 18 are made upright, or the fine grains 10 are re-orientated or are re-orientated accompanying the grain growth in the stress free laminated direction. As a result, there are fundamental improvements in the upright orientation of the laminated body 14. It is thought that this phenomenon can be explained as follows:

FIG. 6 is a model perspective view which shows the phenomenon thought to occur within the thin powders 12 of FIG. 5(b). In the thin powders 12, as is shown in the same diagram, grains which have fallen or grains which are tilting (shown as the broken line in the diagram) due to vertical compression P1 are made upright by the side compression P2, and the essential crystal orientation of the thin powders is restored. As a result, the grains 10 in the thin powders 12 shown in FIG. 5(b) form a state shown in FIG. 5(c).

Figure 7:
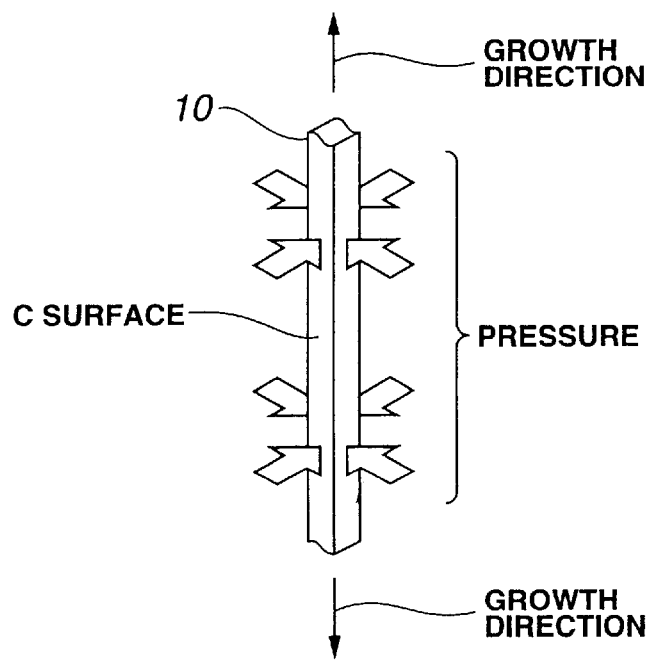
FIG. 7 is a model perspective view which shows the phenomenon thought to occur within the laminated interface 18 of FIG. 5(c)

FIG. 7 is a model perspective view which shows one phenomenon thought to occur within the laminated interface 18 of FIG. 5(c). At the laminated interface 18, as shown in the same diagram, the crushed grains are selectively grown in the direction of weak stress. It is thought that this is attributable to the fact that the grains crushed in the laminated interface 18 are difficult to grow in the direction in which the pressure is imparted. It is thought that the laminated surface forms a state shown in FIG. 5(c) as a result of this phenomenon.

If terminals are attached in the laminated direction of the thermoelectric semiconductor element obtained in this way, a thermoelectric element with low electrical resistance can be obtained. It will be noted that the heating for the sintering of the laminated body during the vertical compression P1 or side compression P2 is within the scope of the present invention.

Based on the present invention described above, because a side compression P2 is applied in addition to vertical compression P1, both the crushing of the grains within the laminated interface and the crystal orientation of the thin powders disturbed by the vertical compression P1 are repaired. As a result, the crystal orientation of the polycrystal material approaches a complete upright orientation and an improvement in the thermoelectric performance can be expected.

(Summary)

Figure 10:
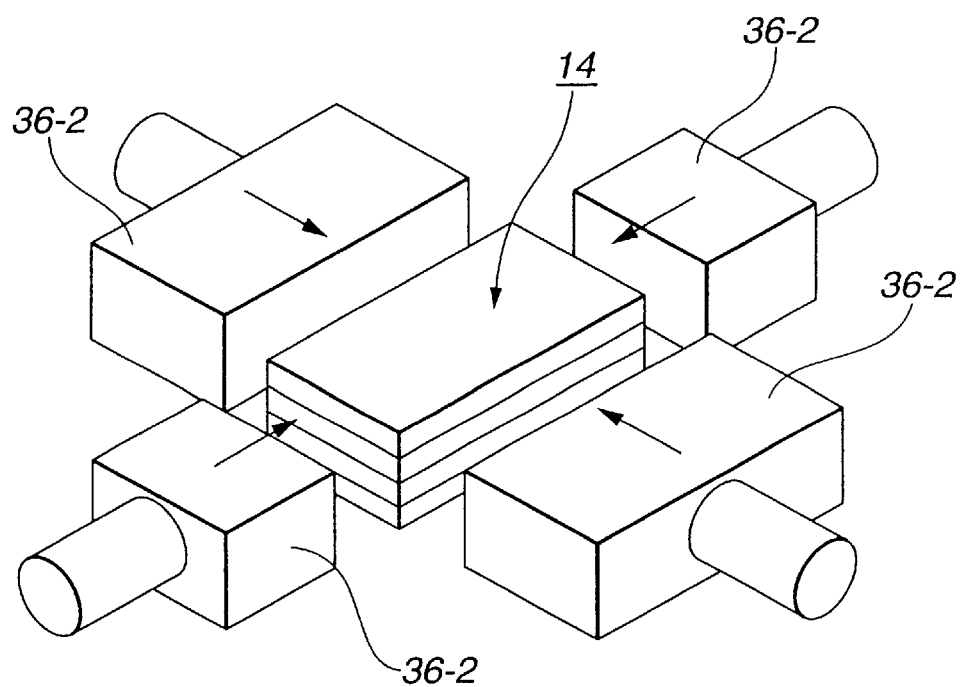
FIG. 10 is a perspective view which shows a concrete example of the side compression P2.

The thermoelectric semiconductor material is manufactured by the formation of a laminated body 14 of thin powders manufactured by a quenching roller method and the simultaneous compression of the side surfaces of the laminated body 14 using a secondary punch 36-2 (see FIG. 10).

(Preferred Embodiment)

The technical concept described above, in which the crushing and the disturbance of the grains generated by the vertical compression P1 are repaired, is an idea which is extremely effective in terms of its improvement of the thermoelectric performance. Here, the technical concept having this feature is shown in a concrete example using a mode that is considered desirable from the viewpoint of industrial application. It will be noted that, among the elements of the configuration described above, and in particular of those for which an additional description is not thought to be necessary, the same names and same reference symbols have been attached and the detailed description thereof omitted. In addition, the embodiment shown below represents a concrete example of the present invention, but the present invention is not limited to this.

Figure 8:
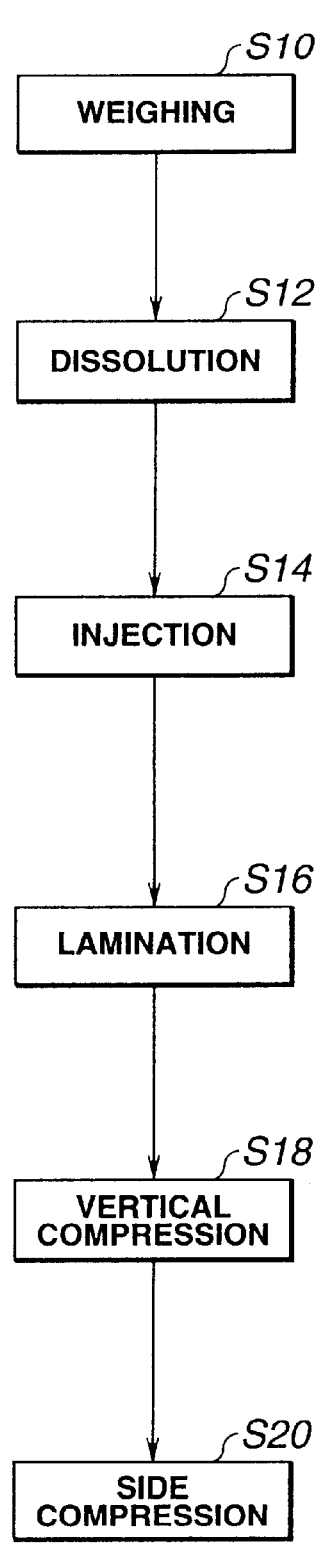
FIG. 8 is a flow chart which shows the entire configuration of the manufacturing process of the thermoelectric element pertaining to the present embodiment.
Figure 8:
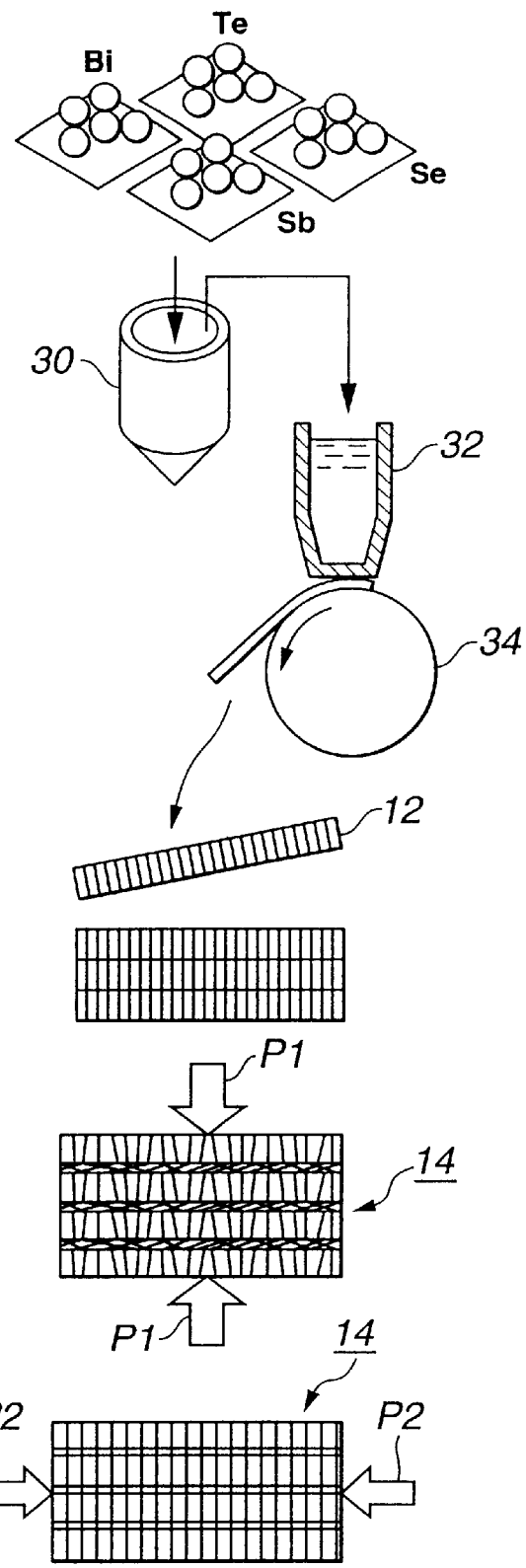

FIG. 8 is a flow chart which shows the entire configuration of the manufacturing process of the thermoelectric elements pertaining to the present embodiment. A description is given below, based on the diagrams, of a description of the configuration of this manufacturing process.

First, as shown in the diagram, the Bismuth (Bi), Tellurium (Te), Selenium (Se) and Antimony (Sb), which constitute the raw materials of the thermoelectric semiconductor, and the impurities used as dopants, are weighed (Step 10), and these are introduced into a crucible 30.

Next, the crucible 30 into which the above-described raw materials have been introduced is heated to melt the raw materials producing a molten bath which constitutes a raw material molten liquid (Step 12).

Following this, the molten bath within the above-described crucible 30 is supplied to a nozzle 32 and this is drop-fed onto the surface of a rotating cooling roller 34 whereby thin powders 12, with sub-micron class grains, are manufactured by a quenching roller method (Step 14). The various conditions for the quenching roller method recommended for the present embodiment are given below:

TABLE 1

Conditions for Quenching Roller Method

| ITEM | P-type | N-type |
| --- | --- | --- |
| Amount of material introduced (g) | 500 | 500 |
| Roller rotational frequency (rpm) | 500 | 500 |
| Heating temperature (° C.) | 660 | 645 |
| Injection nozzle shape (mm) diameter × thickness × number | 0.4ϕ× 1.5t × 4 | 0.6ϕ× 1.5t × 4 |
| Injection nozzle and roller gap (mm) | 1.3 to 1.5 | 1.5 |
| Batches | 4 | 5 |
| Yield | 98% or above | 98% or above |

Figure 13C:
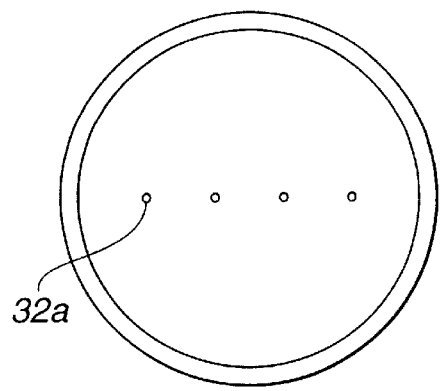
Figure 13A:
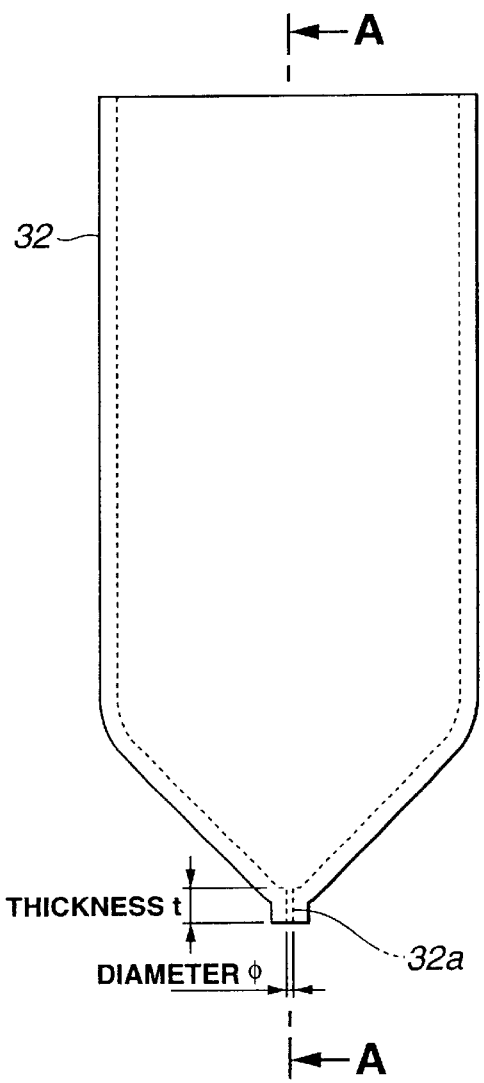
Figure 13B:
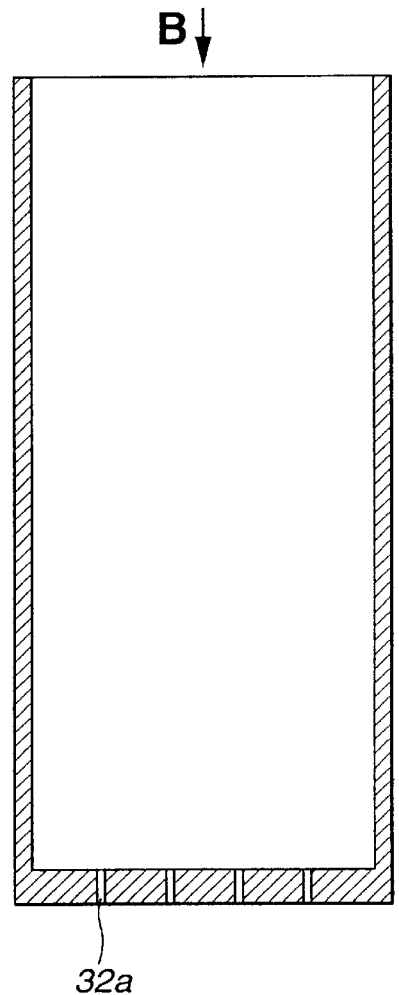

FIGS. 13(a) to 13(c) illustrate a shape of the injection nozzle 32. More concretely, FIG. 13(a) is a side view showing a side of the injection nozzle 32, FIG. 13(b) is a sectional view taken on the line A—A of FIG. 13(a) and FIG. 13(c) is a plan view viewed from the direction indicated by the arrow B of FIG. 13(b). As shown in the figures, for P-type, the injection nozzle 32 has at the tip end thereof four (4) of injection holes 32a, each having 0.4 mm diameter and 1.5 mm thickness. Similarly, for N-type, the injection nozzle 32 has at the tip end thereof four (4) of injection holes 32a, each having 0.6 mm diameter and 1.5 mm thickness.

Thin powders 12 that are formed on the surface of the above-described cooling roller 34 and are obtained by peeling off are laminated a plurality of times in the film thickness direction (Step 16).

Following this, vertical compression P1 is applied to compression the laminated body 14 obtained by the above-described lamination in the laminated direction (Step 18). As a result, the laminated body 14 forms a temporarily-molded state and the peeling off of the thin powders is prevented. The vertical compression P1 is applied in the following way.

Figure 9:
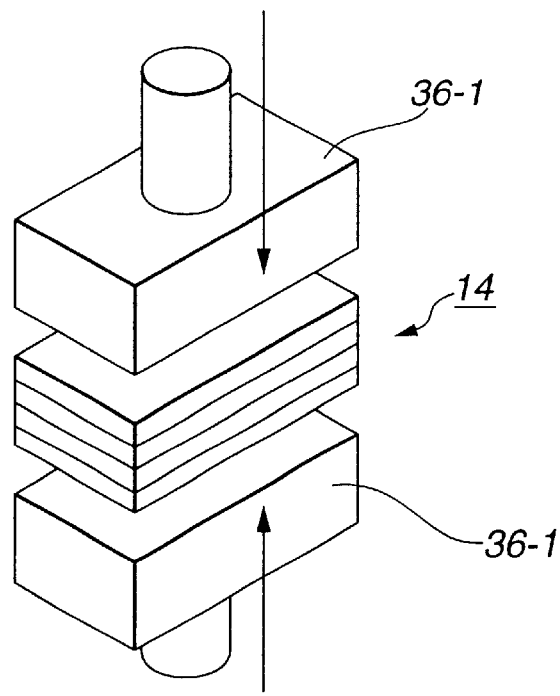
FIG. 9 is a perspective view which shows a concrete example of the vertical compression P1.

FIG. 9 is a perspective diagram which shows a concrete example of the vertical compression P1. As shown in the same diagram, the vertical compression P1 involves the arrangement of a pair of primary punches 36-1 in the upper surface and lower surface of the laminated body 14; this pair of primary punches 36-1 are operated to clamp the laminated body 14 in the vertical direction.

Following this, side compression P2 is applied which further compresses the laminated body 14 from the side direction (step 20) after the above-described vertical compression has been applied. As a result, the grains disturbed by the above-described vertical compression P1 are re-orientated. The compression from the side direction is applied in the following way.

FIG. 10 is a perspective view which shows a concrete example of the side compression P2. As shown in the same diagram, the side compression P2 involves the arrangement of two pairs of secondary punches 36-2 in the 4 side surfaces of the laminated body 14; these two pairs of secondary punches 36-2 are operated to clamp each of the front surface, rear surface, left-side surface and right-side surface of the laminated body 14.

In order for the inventors of the present invention to examine the effects imparted by the vertical compression P1 and side compression P2 on the thermoelectric performance, tests were conducted in which the compressing conditions were altered. The compressing conditions at this time are shown below.

TABLE 2

Sintering Conditions

| ITEM | Vertical Compression | Side Compression |
| --- | --- | --- |
| Method | Hot press<br>Spark plasma sintering<br>HIP<br>CIP<br>Unidirection cold press | Hot press |
| Heating temperature (° C.) | 0 to 500 | 300 to 500 |
| Compressing time (min) | 10 to 120 | 60 to 1200 |
| Pressure force (GPa) | 0.05 to 1 | 0 to 1 |
| Atmosphere | Ar or vacuum | Ar |

Here, as shown in the above-described Table 2, the vertical compression P1 was applied with each of a hot press, spark plasma sintering method, HIP (Hot Isostatic Press), CIP (Cold Isostatic Press) and unidirection cold press.

Figure 11A:
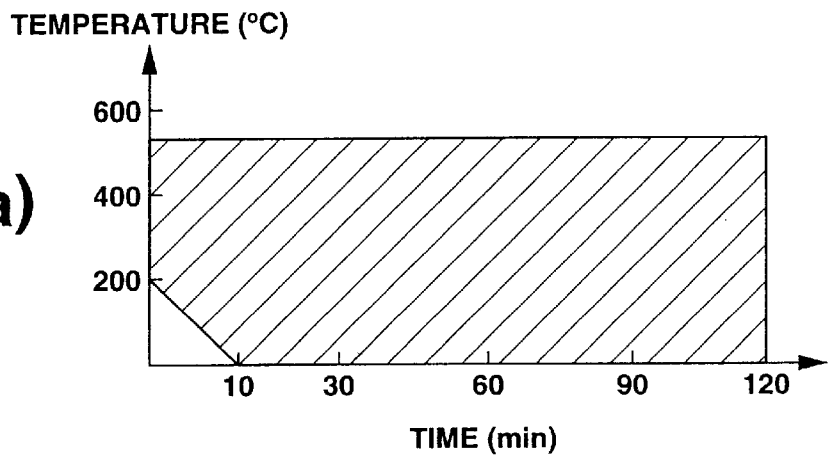
FIGS. 11(a) and 11(b) are graphs which show the relationship between the pressure, time and heating temperature during vertical compression.
Figure 11B:
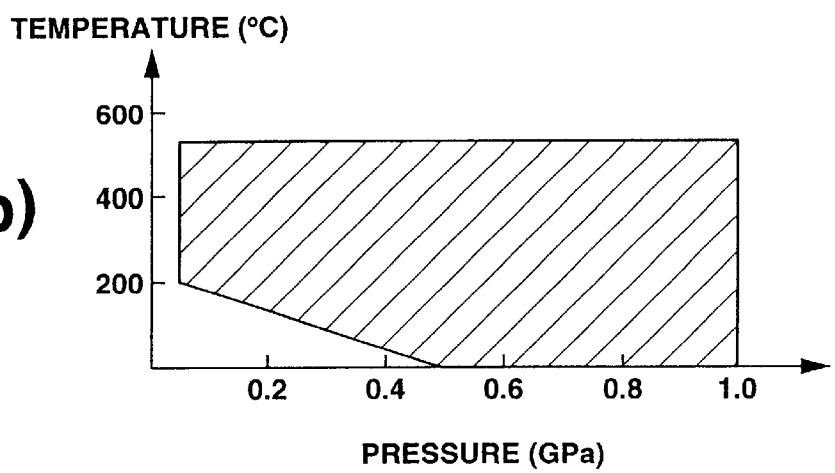

FIGS. 11(a) and 11(b) are graphs which show the relationship between the pressure, time and heating temperature during vertical push-pressuring. An indication of alteration of the pressure, time and heating temperature shown in Table 2 is shown in this diagram. The preferred region within the range shown in the diagram is the region of low temperature, low pressure and short time. This is so that the orientation of the grains is disturbed as little as possible, so that a minimum breaking of the grains at the laminated interface occurs, and so that excessive growth of the grains can be controlled.

The thermoelectric performance of the sintered body obtained by the above-described tests is shown below. It will be noted that the results shown in the table below were measured by a Harman method. The measured temperature at this time was −60 to 60° and the measuring atmosphere was a vacuum.

TABLE 3

Test Result

| No. | Laminated direction Compressing Conditions<br>Temperature (° C.) × Time (min) | | | |
| --- | --- | --- | --- | --- |
| 1 | 500 × 10 | | | |
| 2 | 350 × 30 | | | |
| 3 | 400 × 30 | | | |
| 4 | 430 × 30 | | | |
| 5 | 460 × 30 | | | |
| 6 | 400 × 60 | | | |
| 7 | 400 × 90 | | | |

| | After Vertical Compression<br>(Room Temperature) | | After Side Compression<br>(Room Temperature) | |
| --- | --- | --- | --- | --- |
| No. | ρ (μΩcm) | Z (×10$^{-3}$ K$^{-1}$) | ρ (μΩcm) | Z (×10$^{-3}$ K$^{-1}$) |
| 1 | 1269 | 2.2 | 820 | 3.5 |
| 2 | 1349 | 2.3 | 800 | 3.5 |
| 3 | 1296 | 2.2 | 850 | 3.3 |
| 4 | 1309 | 2.1 | 790 | 3.6 |
| 5 | 1385 | 2.3 | 830 | 3.4 |
| 6 | 1250 | 2.3 | 820 | 3.5 |
| 7 | 1269 | 2.3 | 800 | 3.5 |

As is shown in Table 3 above, it can be seen that, compared to a case in which only vertical compression P1 is applied, the thermoelectric performance is improved when side compression P2 is applied.

Figure 12:
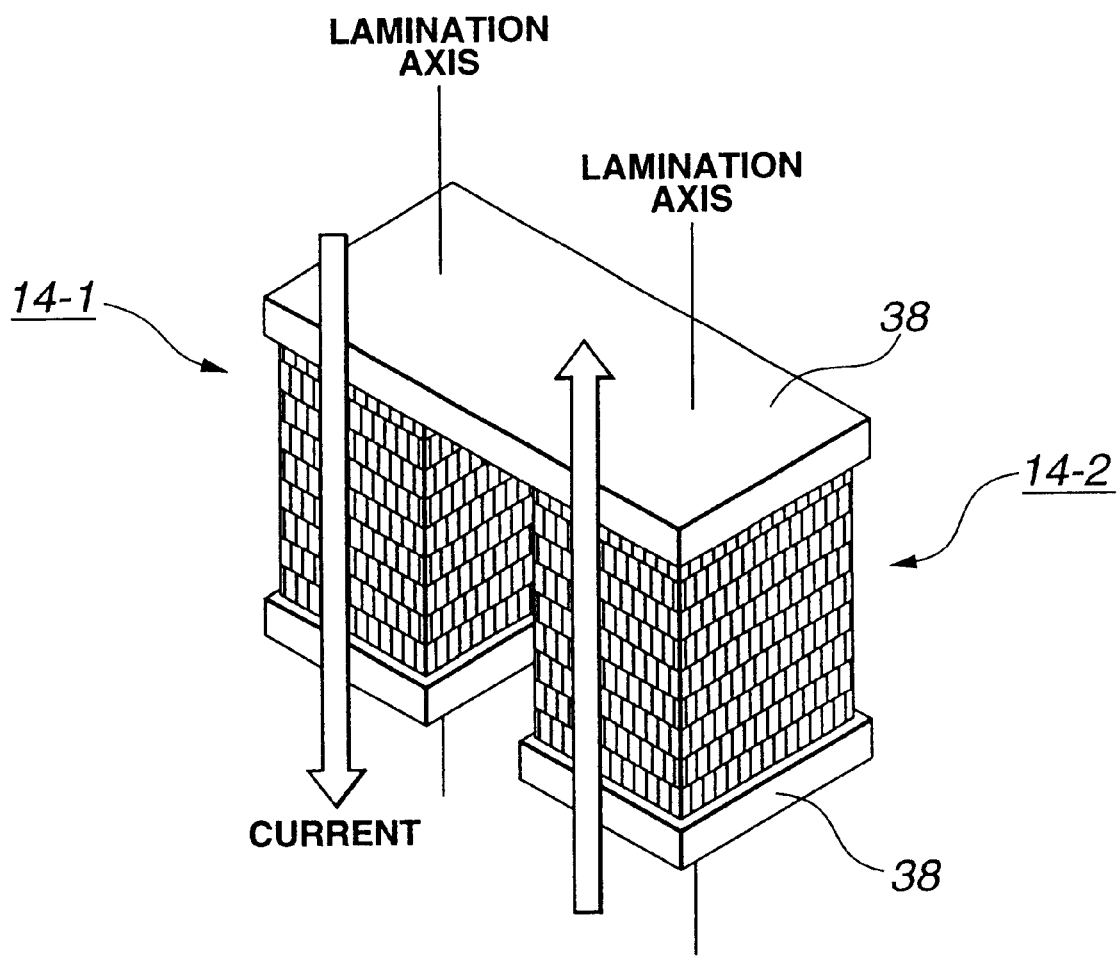
FIG. 12 is a perspective view which shows the structure of the thermoelectric module pertaining to the present invention.

FIG. 12 is a perspective view which shows the structure of the thermoelectric module pertaining to the present invention. If a thermoelectric module in which a thermoelectric semiconductor material manufactured by the above-described method is employed, as is shown in the same diagram, both a P-type laminated body 14-1 and an N-type laminated body 14-2 are formed, and a pair of terminals 38 are formed on the lower surface and upper surfaces of the laminated bodies.

At this time, the above-described terminals 38 are formed in a position in which they are perforated by the laminated body of the P-type laminated body 14-1 and N-type laminated body 14-2. By the arrangement of the terminals 38 in this way, the electric current supplied by way of the terminals 38 is caused to flow in the direction parallel to the laminated axis, that is to say in the direction of low electrical resistance ρ.

What is claimed is:

1. A method for manufacturing a thermoelectric semiconductor material or a thermoelectric semiconductor element comprising the steps of laminating thin powders, which comprise a plurality of stratified structure compound grains, in the film thickness direction of the thin powders, and compressing a laminated body thus obtained, wherein
   the compression is applied from a direction which is orthogonal with the laminated direction of the thin powders.

2. The method for manufacturing a thermoelectric semiconductor material or element according to claim 1, wherein the compression is applied simultaneously on all side surfaces of the laminated body.

3. The method for manufacturing a thermoelectric semiconductor material or element according to claim 1 wherein the compression is applied in a state in which the movement along the laminated direction of the thin powders is constrained.

4. A method for manufacturing a thermoelectric semiconductor material or element comprising:

a step of producing thin powders which comprise a plurality of stratified structure compound grains and in which the C surface of the stratified-structure compound is upright orientated along the film thickness direction;

a step of laminating a plurality of layers of the thin powders in the film thickness direction to form a laminated body;

a first compressing step of compressing the laminated body along the laminated direction of the thin powders; and a second compressing step of further compressing the laminated body from a direction which is orthogonal to the compressing direction of the first compressing step.

5. A method for manufacturing a thermoelectric module comprising:

a step of producing thin powders which comprise a plurality of stratified structure compound grains and in which the C surface of the stratified-structure compound is upright orientated along the film thickness direction;

a step of laminating a plurality of layers of the thin powders in the film thickness direction to form a laminated body;

a first compressing step of compressing the laminated body along the lamination axis of the thin powders;

a second compressing step of further compressing the laminated body from a direction which is orthogonal to the compressing direction of the first compressing step; and a step of forming a pair of terminals on the upper surface and lower surface of a P-type and an N-type laminated body obtained by the second compressing step so as to be positioned on the axis of lamination passing through the laminated body.

6. The method for manufacturing a thermoelectric semiconductor material or element according to claim 2, wherein the compression is applied in a state in which the movement along the laminated direction of the thin powders is constrained.

* * * * *